United States Patent
Foley

(10) Patent No.: US 7,400,140 B2
(45) Date of Patent: Jul. 15, 2008

(54) ROTATION SENSING BY DETECTION OF MAGNETISED REGIONS PROVIDED ON A BODY

(75) Inventor: Ian David Foley, Norfolk (GB)

(73) Assignee: Equipmake Limited, Norfolk (GB)

( * ) Notice: Subject to any disclaimer, the term of this patent is extended or adjusted under 35 U.S.C. 154(b) by 0 days.

(21) Appl. No.: 11/421,904

(22) Filed: Jun. 2, 2006

(65) Prior Publication Data
US 2006/0279279 A1    Dec. 14, 2006

(30) Foreign Application Priority Data
Jun. 14, 2005   (GB) .............................. 0512045.6

(51) Int. Cl.
*G01B 7/30* (2006.01)
(52) U.S. Cl. .............................. 324/207.25; 324/207.2; 324/207.22
(58) Field of Classification Search ................ 324/207.12–207.25, 173–174
See application file for complete search history.

(56) References Cited

U.S. PATENT DOCUMENTS

| 4,646,088 | A | * | 2/1987 | Inoue .................... 340/870.31 |
| 4,851,771 | A | * | 7/1989 | Ikeda et al. ............. 324/207.21 |
| 4,940,936 | A | * | 7/1990 | Grillo et al. ................. 324/174 |
| 5,184,069 | A | * | 2/1993 | Adler et al. ............. 324/207.22 |
| 5,302,893 | A | * | 4/1994 | Yoshimura ............. 324/207.22 |
| 5,713,577 | A | * | 2/1998 | Lannert et al. ............... 277/574 |
| 5,757,180 | A | * | 5/1998 | Chou et al. ............... 324/207.2 |
| 5,898,301 | A | * | 4/1999 | La Croix et al. ....... 324/207.22 |
| 6,404,188 | B1 | * | 6/2002 | Ricks ..................... 324/207.22 |
| 7,183,760 | B2 | * | 2/2007 | Mol et al. ................... 324/174 |

* cited by examiner

*Primary Examiner*—Jay M Patidar
(74) *Attorney, Agent, or Firm*—Barnes & Thornburg LLP

(57) ABSTRACT

A compact arrangement which enables rotation of a component of an apparatus to be sensed is provided. A component having a body with a plurality of discrete magnetised regions on its circumferentially outer surface, each region being formed in a layer and circumferentially spaced apart from each other by non-magnetised regions of the layer, the magnetised regions being circumferentially distributed at substantially the same axial position to enable rotation of the component relative to a sensor to be monitored, wherein the magnetised regions comprise a first group of equally spaced magnetised regions, each of which is magnetised in the same direction, and an additional magnetised region midway between two of the first group of regions, which has a different magnitude of magnetization to the regions of the first group to facilitate monitoring of the rotational position of the body.

8 Claims, 3 Drawing Sheets

ROTATION SENSING BY DETECTION OF MAGNETISED REGIONS PROVIDED ON A BODY

FIELD OF THE INVENTION

The present invention relates to sensing the rotation of a component of an apparatus, and more particularly, a compact arrangement that enables the rotation of a component to be sensed.

BACKGROUND OF THE INVENTION

It is known to facilitate detection of the angular position of a rotor by fastening a permanent magnet to one end of the rotor shaft in close proximity to a Hall effect sensor. Such an arrangement allows angular position to be sensed in a contactless manner so that the sensor does not introduce frictional losses. However, the permanent magnet can occupy a significant volume.

SUMMARY OF THE INVENTION

The present invention provides a component comprising a body having an axis of rotation, and a plurality of discrete magnetised regions at the surface of the body which are circumferentially distributed at substantially the same axial position.

Such a configuration enables the rotational position of component, such as a shaft for example, to be sensed using a Hall effect sensor, and a new or existing component may be modified in accordance with the invention without substantially increasing its volume.

The discrete magnetised regions may be formed in a strip of magnetisable material. Preferably, the strip extends completely around the circumference of the component. The discrete magnetised regions may be formed in magnetisable material which is painted or plated onto the body, for example.

The magnetised regions may be formed by applying magnetisable material to the surface of a body, and then forming a predetermined pattern of discrete magnetised regions in the material. One of the magnetised regions may be magnetised in a detectably different manner to the others so that the orientation of the body can be determined. For example, it may be magnetised to a greater or lesser extent, and/or in a different direction relative to the other magnetised regions.

Preferably, the magnetised regions are equally spaced around the circumference of the body. In a preferred embodiment, a plurality of equally spaced magnetised regions are provided, each of which is magnetised in the same direction, and an additional magnetised region is provided midway between two of the first group of regions, which is magnetised in a detectably different manner, for example the opposite direction, to the regions of the first group. Alternatively, the additional magnetised region may have a different magnitude of magnetisation to the regions of the first group. The rotational position of the body may then be calculated with reference to the position of the additional region.

Groups of magnetised regions may be provided at two or more axially spaced positions to enable angular displacement therebetween to be detected. Similarly, groups of magnetised regions may be provided on two or more bodies to monitor their relative angular positions.

The present invention further provides apparatus including a component as defined above and a sensor for detecting the magnetised regions of the component. Preferably, the sensor is a Hall effect sensor. The apparatus may include processing means coupled to the output of the sensor. In addition, the apparatus may include a plurality of sensors coupled to the processing means which are arranged to detect respective groups of magnetised regions on the component and/or on two or more rotatable components.

The present invention also provides a method for manufacturing a component as defined above, comprising applying magnetisable material to the surface of its body, and magnetising the material to form a plurality of discrete magnetised regions which are circumferentially distributed at substantially the same axial position on the body.

The method may comprise applying a strip of magnetisable material to the body and selectively magnetising the strip to form the discrete magnetised regions.

BRIEF DESCRIPTION OF THE DRAWINGS

Embodiments of the invention will now be described by way of example and with reference to the accompanying schematic drawings, wherein.

DETAILED DESCRIPTION

It should be noted that the Figures are diagrammatic and not drawn to scale. The same reference signs are generally to refer to corresponding or similar features in modified and different embodiments.

Figure 1:
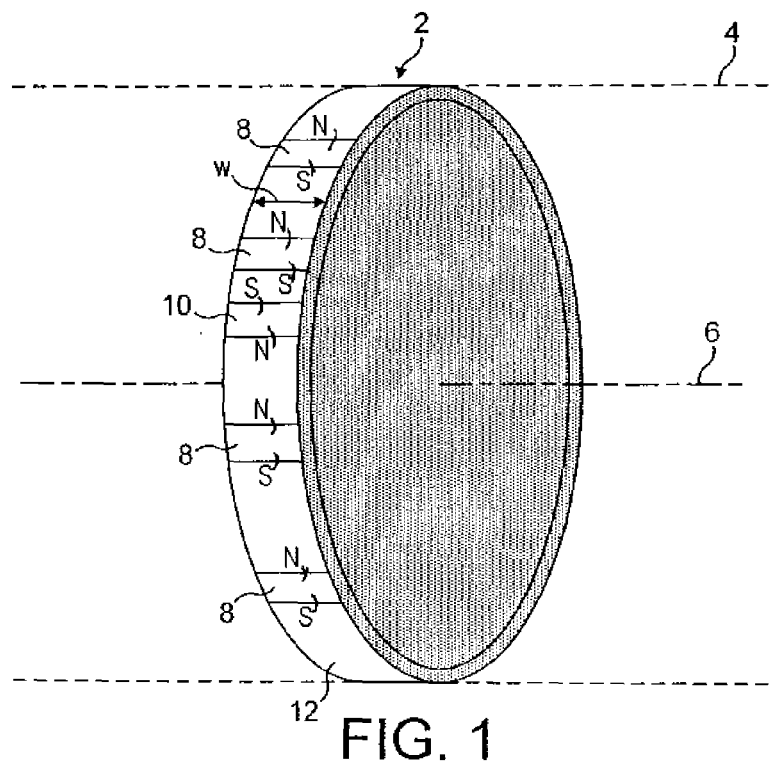
FIG. 1 shows a cross-sectional perspective view of part of a shaft according to an embodiment of the invention.

FIG. 1 shows a transverse slice 2 taken from a component in the form of a shaft 4. The shaft has an axis of rotation 6. A plurality of discrete magnetised regions 8 are provided at the surface of the shaft around the circumference of the slice 2. Regions 8 are equally spaced and magnetised in the same circumferential direction. A further discrete magnetised region 10 is provided between two other regions 8, and is magnetised in the opposite circumferential direction to the regions 8. Region 10 acts as a "sync" region.

The magnetised regions are formed in a strip of magnetisable material 12 which extends completely around the circumference of the shaft. The width, w, of the strip 12 measured in the axial direction may be approximately 10 mm, for example. The strip of magnetisable material 12 may be painted or plated onto the surface of the shaft 4, for example, in a thin layer. The plurality of discrete magnetised regions can then be formed in a predetermined pattern in the magnetisable material, thereby encoding or recording a predetermined sequence of regions.

Any number of discrete magnetised regions may be provided at a given axial position on a body. Typically, 4-40 regions may be provided.

In use, the shaft 4 is located in an apparatus with a Hall effect sensor provided adjacent to the strip 12. Typically, the sensor may be approximately 1 mm from the surface of the shaft. During rotation of the shaft, the sensor generates a series of pulses, as discussed in more detail below.

Figure 2:
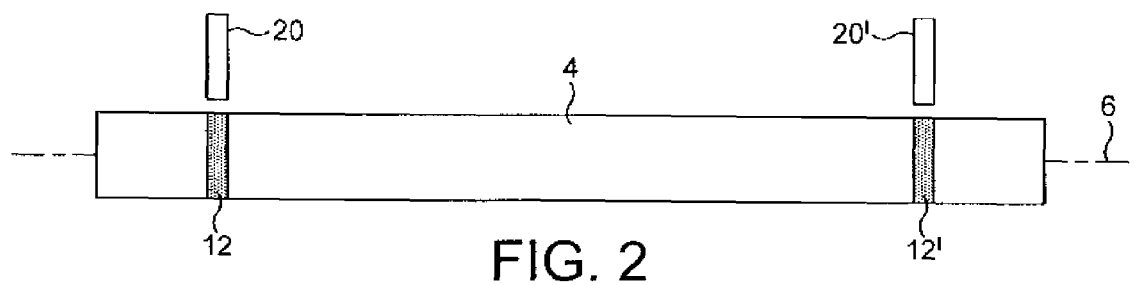
FIG. 2 shows a side view of shaft according to a second embodiment of the invention, together with associated sensors.

The shaft shown in FIG. 2 includes two strips of magnetisable material 12, 12'. A group of discrete magnetised regions is formed in each strip as described above. A respective Hall effect sensor 20, 20', is located adjacent each strip. Processing means are provided to receive output signals from both Hall effect sensors and calculate any difference in the angular positions of the corresponding portions of the shaft for example.

Processing means may also operate to calculate the torque in the shaft, by multiplying the stiffness of the shaft by the angular displacement of one portion from the other. The processing means may also determine the speed of rotation of the shaft and therefore the power being transmitted thereby.

By providing the arrangements of magnetised regions and sensors shown at each end of the shaft in FIG. 2 on a number of shafts, there relative rotation or positions may be determined. For example, this could enable the relative motion between the crank shaft and the cam shafts in an engine, or the gears on the input and output shafts of a gear box or differential to be determined.

It will be appreciated that the structural modifications required to implement an embodiment of the present invention may be minimal. The material of the body to be monitored may be formed of any material (whether magnetic or non-magnetic). Only a small area of the body is required to provide the magnetised regions, and the only other requirement is space to mount the associated sensor.

Figure 3:
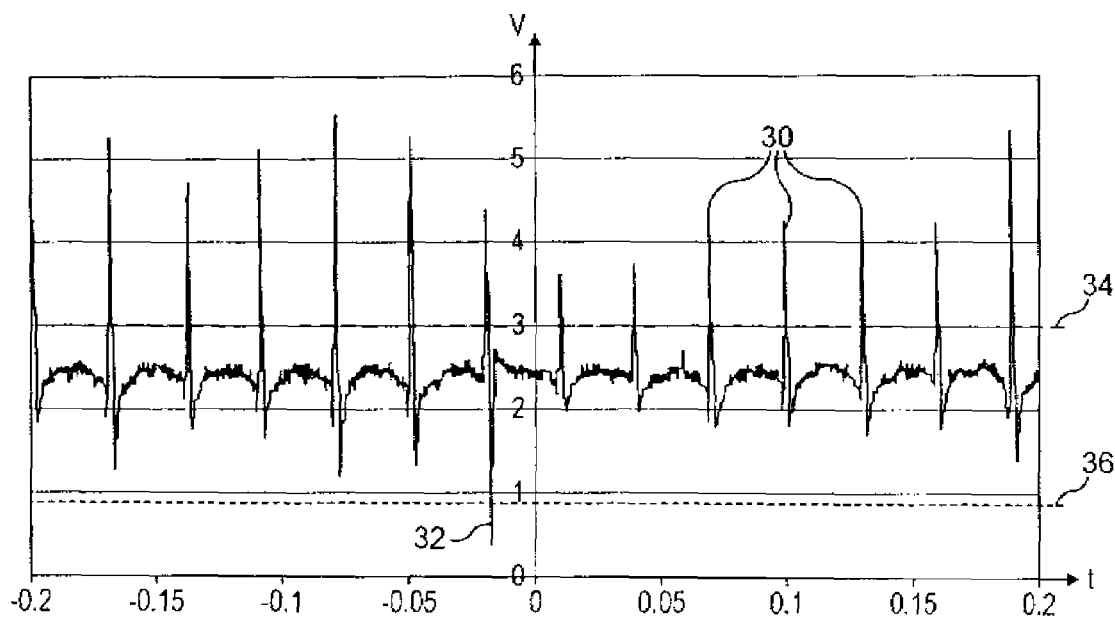
FIG. 3 shows a waveform generated by a sensor adjacent the magnetised regions shown in FIG. 1.

An example of a waveform which may be generated by positioning a Hall effect sensor in close proximity to the strip of magnetisable material 12 on the shaft 4 in FIG. 1 is shown in FIG. 3. During rotation of the shaft, the region 8 generates timing pulses 30, whilst the sync region 10 generates a sync pulse 32, in the opposite direction to the timing pulses. Each type of pulse is detected by reference a threshold value, namely timing pulse threshold 34 and sync pulse threshold 36 marked in FIG. 3 by a dashed line and a dotted line, respectively. The use of thresholds allows for a degree of variation in the amplitude of the pulses. In practice, this may vary due to eccentricity in the shaft for example, which leads to variation in the gap between the surface of the magnetised material and the Hall effect sensor. Variation in the dimensions and/or magnetisation of the magnetised regions may also lead to differences in the sizes of the pulses generated.

The threshold values 34 and 36 are constant DC levels, set by digital-to-analogue-convertors, but are essentially constant reference voltages for the comparators.

Figure 4:
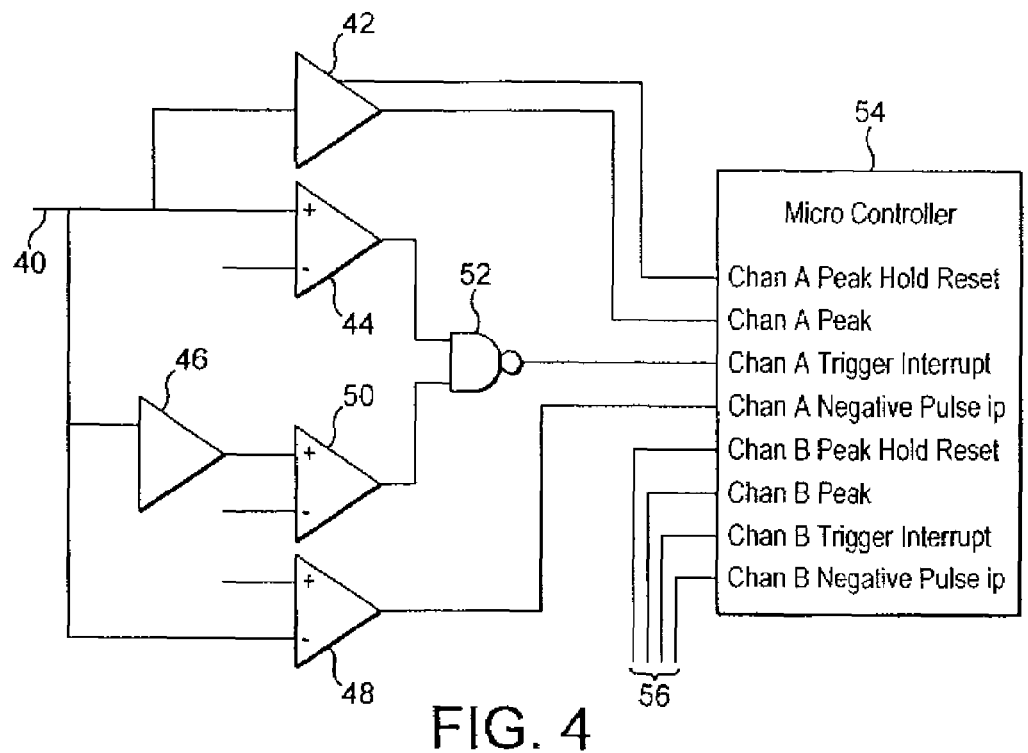
FIG. 4 shows a circuit diagram of processing means for connection to a sensor in accordance with an embodiment of the invention.

A circuit diagram of processing means for receiving an output signal from the Hall effect sensor is shown in FIG. 4.

The sensor output signal is applied to line 40 and is fed to the input of a peak hold circuit 42, the positive input of a comparator 44, the input of a differentiator 46 and the negative input of a comparator 48. A voltage corresponding to the timing pulse threshold 34 is applied to the negative input of comparator 44, whilst a voltage corresponding to the sync pulse threshold 36 is applied to the positive input of comparator 48. The output of differentiator 46 is connected to the positive input of a further comparator 50. A further threshold voltage is applied to the negative input of the comparator 50.

The outputs of comparators 44 and 50 are applied to the two inputs of a NAND gate 52. The outputs of devices 42, 44, 48 and 52 are applied to inputs of a micro-controller 54. A corresponding set of outputs associated with a second Hall effect sensor are applied via lines 56 to a second set of inputs to the microcontroller 54.

Figure 5:
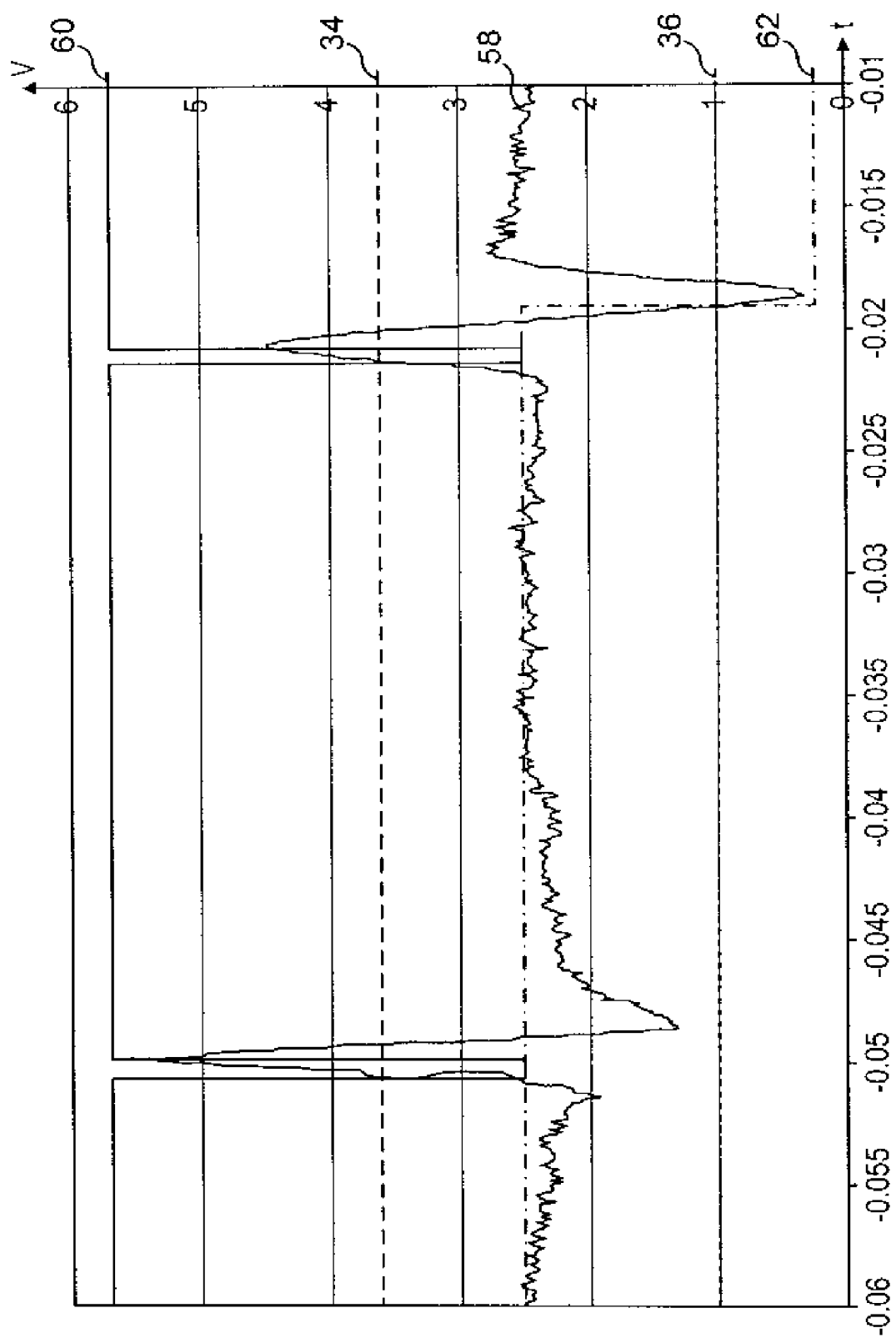
FIG. 5 is an enlarged portion of the waveform shown in FIG. 3, together with other signals generated in the circuit shown in FIG. 4.

Operation of the circuit shown in FIG. 4 will now be described with reference to the waveforms shown in FIG. 5.

Signal 58 represents an enlarged portion of the signal shown in FIG. 3. Waveform 60 corresponds to the output of NAND gate 52 (shown by a solid line), and waveform 62 represents the latched output of comparator 48 (shown by a line alternating dots and dashes).

When the level of the signal 58 exceeds the threshold value denoted by line 34, the output of comparator 44 goes high. At this point, the output of comparator 50 will also be positive. The threshold level applied to the negative input of comparator 50 is set to zero volts. When both the outputs of comparators 44 and 50 are high, the output the NAND gate will go low. This indicates the occurrence of a positive-going pulse.

When the rate of change with time of the signal 58 changes from positive to negative, indicating the top of a peak, the output of pulse comparator 50 will go low, and so the output of the NAND gate will go high. Transition of this signal from low to high triggers an interrupt in the microcontroller, and this event is time-stamped by the microcontroller. At this point, the microcontroller also checks the latched output of comparator 48. If this is high, then the microcontroller registers that the time just measured is that for pulse number 1. Otherwise, it is identified as the next pulse in the train.

Peak hold circuit 42 is reset after every pulse. It then follows the next pulse and holds its peak value. This is read by the microprocessor before being reset to zero. This enables the microcontroller to automatically change the gain of the input circuit reading the Hall effect sensor, and act to "autoscale" its output to ensure that the system remains within appropriate operating parameters despite drift due to temperature variation, air gap variation or other factors.

The DC threshold values applied to comparators 44, 48 and 50 may be set manually during installation of the rotation sensing arrangement.

Where the microcontroller receives inputs associated with two separate sensors, the angle of rotation between the respective bodies, or portions of the same body, can be calculated by counting the number of pulses and fractions of a pulse between them.

The invention claimed is:

1. A component comprising: a body having an axis of rotation, defining a circumferential outer surface, and having a plurality of discrete magnetised regions on said surface, the regions being formed in a layer of material on said surface and circumferentially spaced apart from each other by non-magnetised regions in said layer, the magnetised regions being circumferentially distributed at substantially the same axial position to enable rotation of the component relative to a sensor to be monitored, wherein the magnetised regions comprise a first group of equally spaced magnetised regions, each of which is magnetised in the same direction, and an additional magnetised region midway between two of the first group of regions, which is magnetised in the opposite direction to the regions of the first group to facilitate monitoring of the rotational position of the body.

2. A component of claim 1 wherein the discrete magnetised regions are formed in a strip of magnetisable material.

3. A component of claim 2 wherein the strip extends completely around the circumference of the component.

4. Apparatus including a component of claim 1 and a sensors for detecting the magnetised regions of the component.

5. A component comprising: a body having an axis of rotation, defining a circumferential outer surface, and having a plurality of discrete magnetised regions on said surface, each region being formed in a layer of material on said surface and circumferentially spaced apart from each other by non-magnetised regions to said layer, the magnetised regions being circumferentially distributed at substantially the same axial position to enable rotation of the component relative to a sensor to be monitored, wherein the magnetised regions comprise a first group of equally spaced magnetised regions, each of which is magnetised in the same direction, and an additional magnetised region midway between two of the first group of regions, which has a different magnitude of magnetisation to the regions of the first group to facilitate monitoring of the rotational position of the body.

6. A component of claim 5 wherein the discrete magnetised regions are formed in a strip of magnetisable material.

7. A component of claim 6 wherein the strip extends completely around the circumference of the component.

8. Apparatus including a component of claim 5 and a sensor for detecting the magnetised regions of the component.

* * * * *